(12) United States Patent
Guang et al.

(10) Patent No.: US 7,508,089 B2
(45) Date of Patent: Mar. 24, 2009

(54) OVER SPEED CONTROL CIRCUIT FOR A WIND TURBINE GENERATOR WHICH MAXIMIZES THE POWER EXPORTED FROM THE GENERATOR OVER TIME

(75) Inventors: Huang Tai Guang, Guangzhou (CN); Liu Jian Fei, Shenzhen (CN); Brian Gaza, Naperville, IL (US); Robert F. Wentink, Chicago, IL (US)

(73) Assignee: International Components Corporation, Westchester, IL (US)

( * ) Notice: Subject to any disclaimer, the term of this patent is extended or adjusted under 35 U.S.C. 154(b) by 0 days.

(21) Appl. No.: 11/377,251

(22) Filed: Mar. 16, 2006

(65) Prior Publication Data

US 2007/0216163 A1    Sep. 20, 2007

(51) Int. Cl.
*F03D 9/00* (2006.01)
*H02P 9/04* (2006.01)

(52) U.S. Cl. .................................. 290/44; 290/55
(58) Field of Classification Search ............. 290/43, 290/44, 54, 55; 416/132 B; 415/7, 4.2; 60/398
See application file for complete search history.

(56) References Cited

U.S. PATENT DOCUMENTS

| | | | |
|---|---|---|---|
| 4,150,301 A | 4/1979 | Bergey, Jr. | |
| 4,198,572 A * | 4/1980 | Kant | 290/44 |
| 4,352,629 A | 10/1982 | Cheney, Jr. | |
| 4,355,955 A | 10/1982 | Kisovec | |
| 4,427,897 A * | 1/1984 | Migliori | 290/44 |
| 4,456,429 A | 6/1984 | Kelland | |

(Continued)

FOREIGN PATENT DOCUMENTS

GB    2186033    8/1987

(Continued)

OTHER PUBLICATIONS

Energy Networks Association, *Engineering Recommendation, G83/1*, Sep. 2003, *Recommendations for the Connection of Small-Scale Embedded Generators (Up to 16 A Per Phase) in Parallel with Public Low-voltage Distribution Networks*. London, W2 2HH, pp. 1-63.

*Primary Examiner*—Julio Gonzalez
(74) *Attorney, Agent, or Firm*—John S. Paniaguas; Katten Muchin Rosenman LLP (57) ABSTRACT

An over speed control circuit for a wind turbine generator is disclosed which optimizes the time that the wind turbine generator is operational and thus maximizes the power output over time. The over speed control circuit forms a closed feedback loop which periodically measures the output voltage of the wind turbine generator in order to regulate its speed by electronically controlling the load on the generator. The over speed control circuit in accordance with the present invention is adapted to work in conjunction with known over speed protection lock out relays. More particularly, the over speed control circuit causes a short circuit to be placed the generator terminals when the generator voltage reaches a threshold value, relatively less than the threshold value used to trigger the over speed lockout relay. As such, the over speed control circuit minimizes the operation of the lockout relay, thereby maximizing the power output of the generator over time making such wind turbine generator systems much more practical as a renewable energy source.

7 Claims, 7 Drawing Sheets

U.S. PATENT DOCUMENTS

| | | | |
|---|---|---|---|
| 4,483,657 A | 11/1984 | Kaiser | |
| 4,565,929 A | 1/1986 | Baskin et al. | |
| 4,692,095 A | 9/1987 | Lawson-Tancred | |
| 5,225,712 A | 7/1993 | Erdman | |
| 5,506,453 A | 4/1996 | McCombs | |
| 5,907,192 A | 5/1999 | Lyons et al. | |
| 6,256,212 B1 | 7/2001 | Wobben | |
| 6,265,785 B1 | 7/2001 | Cousineau et al. | |
| 6,541,877 B2 | 4/2003 | Kim et al. | |
| 6,836,028 B2 * | 12/2004 | Northrup et al. | 290/44 |
| 6,856,040 B2 * | 2/2005 | Feddersen et al. | 290/44 |
| 7,008,172 B2 | 3/2006 | Selsam | |
| 2002/0079706 A1 * | 6/2002 | Rebsdorf et al. | 290/55 |
| 2002/0117861 A1 | 8/2002 | Kim et al. | |
| 2004/0026929 A1 * | 2/2004 | Rebsdorf et al. | 290/44 |
| 2004/0219018 A1 | 11/2004 | Selsam | |
| 2005/0012339 A1 | 1/2005 | Mikhall et al. | |
| 2005/0017512 A1 | 1/2005 | Kikuchi et al. | |
| 2005/0034937 A1 | 2/2005 | Agardy et al. | |
| 2005/0042101 A1 | 2/2005 | Hun | |
| 2005/0200337 A1 * | 9/2005 | Schreiber et al. | 323/205 |
| 2005/0230979 A1 | 10/2005 | Bywaters et al. | |
| 2005/0236839 A1 | 10/2005 | Bianchi | |
| 2006/0006658 A1 | 1/2006 | McCoin | |
| 2006/0012182 A1 | 1/2006 | McCoin | |
| 2007/0216165 A1 * | 9/2007 | Oohara et al. | 290/44 |
| 2007/0246943 A1 * | 10/2007 | Chang et al. | 290/44 |

FOREIGN PATENT DOCUMENTS

| | | |
|---|---|---|
| JP | 2000-179446 | 6/2000 |
| JP | 2002-315395 | 10/2002 |
| SE | 521083 | 9/2003 |

* cited by examiner

OVER SPEED CONTROL CIRCUIT FOR A WIND TURBINE GENERATOR WHICH MAXIMIZES THE POWER EXPORTED FROM THE GENERATOR OVER TIME

BACKGROUND OF THE INVENTION

1. Field of the Invention

The present invention relates to an over speed control circuit for optimizing the power output of a wind turbine generator and more particularly to a circuit for optimizing the operational time and thus power output over time of a wind turbine generator which coordinates with known over speed relay lockout protection circuitry and incorporates closed feedback control that periodically measures the output voltage of the generator to regulate its speed by electronically controlling the load on the generator to minimize activation of the over speed relay lockout protection circuitry.

2. Description of the Prior Art

Wind turbine generator systems are generally known in the art. Examples of such systems are disclosed in U.S. Pat. Nos. 4,565,929; 5,506,453; 5,907,192; 6,265,785; and 6,541,877. Such wind turbine generator systems are also described in U.S. Patent Application Publication Nos. US2002/0117861; 2005/0034937; 2005/0230979; 2005/0236839; 2006/0006658; and 2006/0012182. Due to the ever-increasing demand and increasing cost for electrical power, renewable energy sources, such as wind turbine generator systems, are becoming more and more popular for generating electrical power. Such wind turbine generator systems are known to be used individually to generate supplemental or excess power for individual, residential or light industrial users to generate electrical power in the range of 1-2 kw. Such wind turbine generator systems are also known to be aggregated together, forming a wind turbine generator farm, to produce aggregate amounts of electrical power. It is also known that unconsumed electrical power generated by wind turbine generators is connected to the utility power grid.

Such wind turbine generators are known to include a wind turbine, which includes a plurality of turbine blades connected to a rotatable shaft. The rotatable shaft is rigidly connected to a direct current (DC) generator. Wind causes rotation of the wind turbine which acts as the prime mover for a DC generator. The generator, for example, a self-excited generator, generates DC electrical power.

One problem with such systems is that wind speeds are not constant. As is known in the art, the voltage output of the generator is a cubic function of the speed of rotation of the turbine blades and the direct connected generator. As such, the effect of wind gusts on the wind turbine generator must be controlled to prevent damage to the wind turbine generator.

Some wind turbine generator systems are known to use some type of mechanical braking to protect the wind turbine generator from an over speed condition. For example, U.S. Pat. No. 5,506,453 utilizes the pitch of the wind turbine blades to protect the wind turbine from over speed. In particular, the blades of the wind turbine are mechanically coupled to a rotatable mechanical hub. The blades are configured so as to be rotatable about their longitudinal axis relative to the hub allowing the pitch of the turbine blades to be varied. The pitch of the blades is turned in such a way as to create braking of the wind turbine.

Other known systems utilize mechanical brakes, such as disclosed in U.S. Patent Application Publication No. US 2005/0034937. Yet other systems disclose the use of aerodynamic-type brakes as well as mechanical brakes, for example, as disclosed in U.S. Pat. No. 6,265,785, to protect the wind turbine from over speed.

While mechanical brakes do an adequate job of protecting the wind turbine generator from over speed, mechanical braking systems do little to optimize the operational time and thus power output of the wind turbine generator. Moreover, such mechanical braking systems are mechanically complex and are, thus, relatively expensive.

As such, electrical braking systems have been developed to control over speed of wind turbine generator systems. For example, Japanese Patent Publication JP2000-179446 discloses an electrical braking system for a wind turbine generator. The system disclosed in the Japanese patent publication includes a relay whose contacts are connected across the output terminals of the generator. When an over speed condition is detected, the relay is energized which, in turn, shorts out the output terminals of the generator, which loads the generator and causes it to slow down and stop.

In many countries, for example, in Europe, such relay protection is dictated by industrial standards, for example, the Energy Networks Association, an engineering association in the UK, promulgated Engineering Recommendation G83/1, September 2003, Recommendations For the Connection of Small-Scale Embedded Generators (Up to 16 A Per Phase) In Parallel With Low Voltage Distribution Networks", specifies an over speed lockout relay connected across the generator terminals. Upon detection of an over speed condition, the lock out relay shorts out the generator terminals, which causes the generator to slow down and stop. The standard specifies a three-minute wait period before the relay can be de-energized so that the wind turbine generator can be restarted.

Although the electrical brake is effective in preventing damage to the wind turbine generator due to over speed, such outages frustrate the practicality of using such wind turbine generator and connecting them to a utility power grid. Thus, there is a need for a control circuit for a wind turbine generator that not only protects the wind turbine generator from over speed, but also optimizes the time that the wind turbine generator is operational and thus maximizes the output power from the generator.

SUMMARY OF THE INVENTION

The present invention relates to an over speed control circuit for a wind turbine generator which optimizes the time that the wind turbine generator is operational and thus maximizes the power output over time. The over speed control circuit forms a closed feedback loop which periodically measures the output voltage of the wind turbine generator in order to regulate its speed by electronically controlling the load on the generator. The over speed control circuit in accordance with the present invention is adapted to work in conjunction with known over speed protection lock out relays. More particularly, the over speed control circuit causes a short circuit to be placed the generator terminals when the generator voltage reaches a threshold value, relatively less than the threshold value used to trigger the over speed lockout relay. As such, the over speed control circuit minimizes the operation of the lockout relay, thereby maximizing the power output of the generator over time making such wind turbine generator systems much more practical as a renewable energy source.

DESCRIPTION OF THE DRAWING

These and other advantages of the present invention will be readily understood with reference to the following specification and attached drawing wherein.

DETAILED DESCRIPTION

The present invention relates to an over speed control circuit for a wind turbine generator that is configured to co-ordinate with a conventional over speed lock-out relay to optimize the operating time and thus the power exported by the generator over time in an environment of varying wind conditions. More particularly, available electrical power for export from a wind turbine generator is approximately equal to the cube of the generator speed. Since the generator is rigidly coupled to the wind turbine, the generator rotational speed (i.e. revolutions per minute or RPM) is directly proportional to the wind speed. With a wind speed of, for example, 10 meters/second a conventional generator can support a 1.0 kWatt output, for example. Because the generator voltage output curve is a cube function, a relatively small change in wind speed can create a large change in the generator output voltage. Such changes in the wind speed can cause damage to the turbine as well as the generator attached to the turbine and the circuitry connected to the generator terminals. In known wind turbine generator systems, a electromechanical braking system is applied during an over speed condition which stops the turbine, reducing the DC output of the generator to zero. Unfortunately, some known systems utilize a lockout relay which, as discussed above, locks out the wind turbine generator system for a nominal period, such as 3 minutes, any time the generator voltage exceeds a threshold indicative of an over speed condition. Thus, during conditions when high wind speeds exist and the opportunity to export maximum power, the generator must be shut down. The over speed control circuit in accordance with the present invention solves this problem by applying electronic braking to the generator when the output voltage at the generator terminals exceeds a first predetermined threshold indicative of an over speed condition. In accordance with an important aspect of the invention, the first threshold is relatively lower than a second predetermined threshold, used to trigger the over speed lock out relay. As such, the over speed control circuit in accordance with the present invention minimizes the operation of the over speed lockout relay, thereby maximizing the power output of the generator over time making such wind turbine generator systems much more practical as a renewable energy source.

Figure 1:
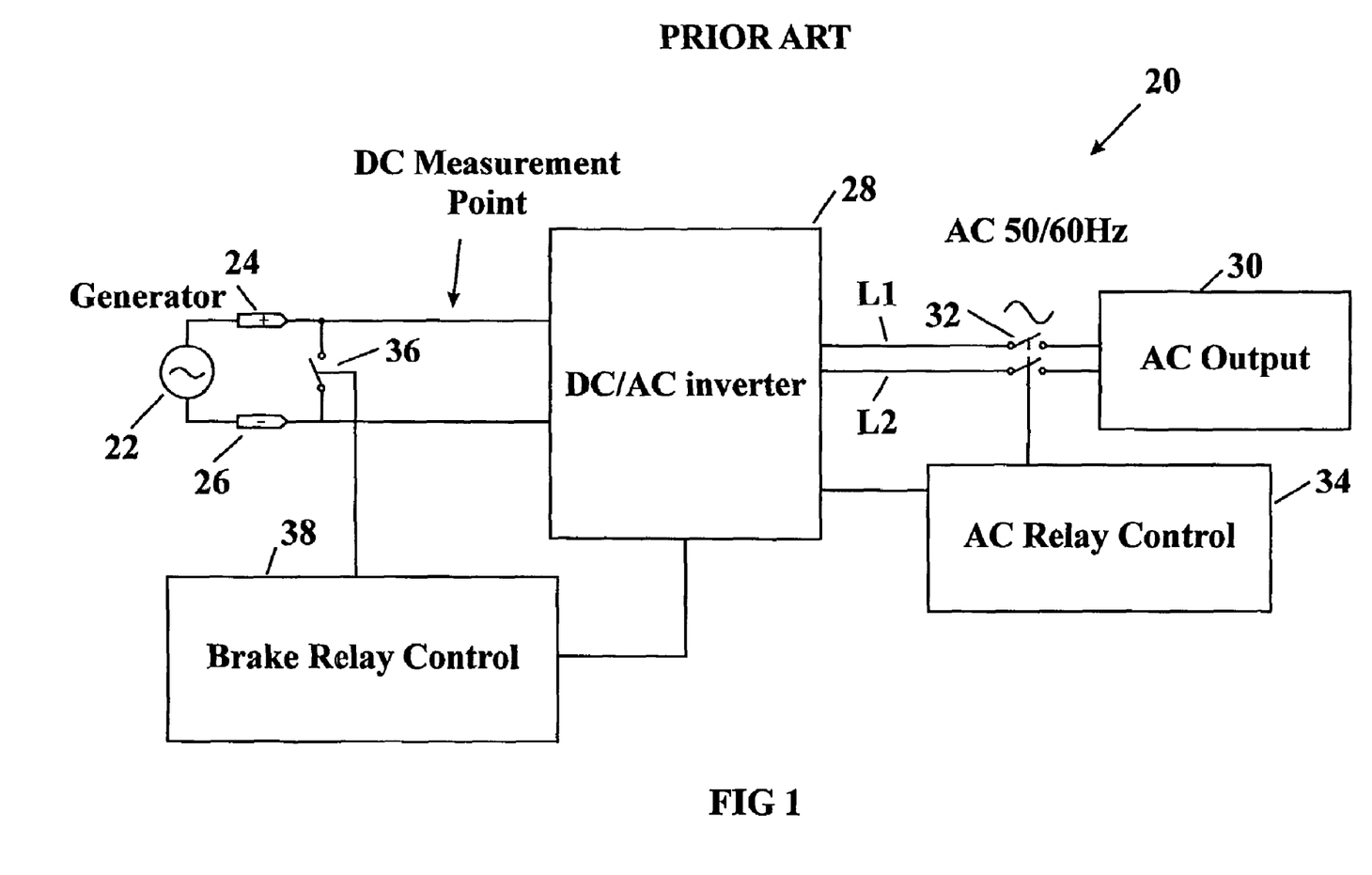
FIG. 1 is a block diagram of a known control circuit for a wind turbine generator. Illustrating a lockout relay across the generator terminals.

FIG. 1 illustrates a conventional wind turbine generator system, generally identified with the reference numeral 20.

The wind generator system 20 includes a generator 22, such as, a self-excited DC generator. A wind turbine (not shown) functions as a prime-mover for the generator 22. The generator 22 generates a DC voltage across its output terminals 24, 26 as a cubic function of the rotational speed of the generator 22. In as much as the generator 22 is directly coupled to the wind turbine, the rotational speed of the turbine and generator is directly proportional to the wind speed. As such, the output voltage at the generator terminals 24 and 26 is a cubic function of the wind speed.

The output terminals 24, 26 of the generator 22 are coupled to an inverter, shown within the block 28. The inverter 28 converts the DC output voltage, available at the output terminals 24, 26 of the generator 22, to an AC voltage suitable for connection to a utility AC power grid, generally identified with the reference numeral 30. The AC power grid 30 may be a phase to phase 230/240 Volts AC, suitable for residential, commercial and industrial application. In the exemplary embodiment shown, shown, the inverter 28 generates a phase to phase voltage across two output phases $L_1$ and $L_2$, for example, 230/240 Volts AC.

Depending on the configuration of the utility AC power grid 30, the inverter 28 may also include a ground conductor for use with utility AC power grids which are 230/240 Volts AC with a center tap ground, for providing 230/240 Volts AC phase to phase and 115/120 Volts AC phase to ground. In such a system, the inverter ground conductor (not shown) would be electrically coupled to the utility center tap ground. The principles of the present invention are applicable to wind turbine generator systems 20 configured to be connected to various configurations of the utility AC power grid 30.

The phase to phase output $L_1$ and $L_2$ of the inverter 28 is connected to the utility AC power grid 30 by way of a grid relay 32. The grid relay 32 ensures that the output of the inverter 28 is in phase with the utility AC power grid before enabling any connection between the two. The grid relay 32 is under the control of an AC Relay Control Circuit 34. The AC Relay Control Circuit 34 monitors the phase of the output of the inverter 28 and the phase of the utility AC power grid 30. When the phase of the inverter output is synchronized with the phase of the utility AC power grid 30, the AC Relay Control Circuit 34 causes the grid relay 32 to connect the two together.

In order to protect the wind turbine generator system 20 from damage from over speed resulting from wind gusts, some wind turbine generator systems 20 include a brake relay 36, as mentioned above. The brake relay 36 is connected across the output terminals 24, 26 of the generator 22. The brake relay 36 may be an electromechanical relay, for example, as specified by G83/1, that shorts the terminals 24, 26 of the generator 22 together when the relay is activated. Shorting the terminals 24, 26 of the generator 22 together creates a load on the generator 22 and slows down and eventually stops the generator 22, thus acting as an electronic brake. Due to the variability of the wind speed, many known wind turbine generator systems 20, such as those systems designed to the Engineering Recommendation G83/1, discussed above, continuously monitor the output voltage of the generator 22 at a DC Measurement Point. When the output voltage of the generator 22 exceeds the lockout threshold voltage, for example, 310 Volts DC, indicative of an over speed condition, a Brake Relay Control Circuit 38 activates the brake relay 36, which shorts the terminals 24, 26 of the generator 22 and maintains the short circuit condition, thus locking out the generator 22, for a time period of 3 minutes, for example. This lock out condition causes the wind turbine generator system 20 to be off-line during a wind condition in which the system could be delivering maximum power to the utility AC power grid 30. The lock out condition also makes wind turbine energy systems 20 less desirable as a renewable energy source.

Figure 2:
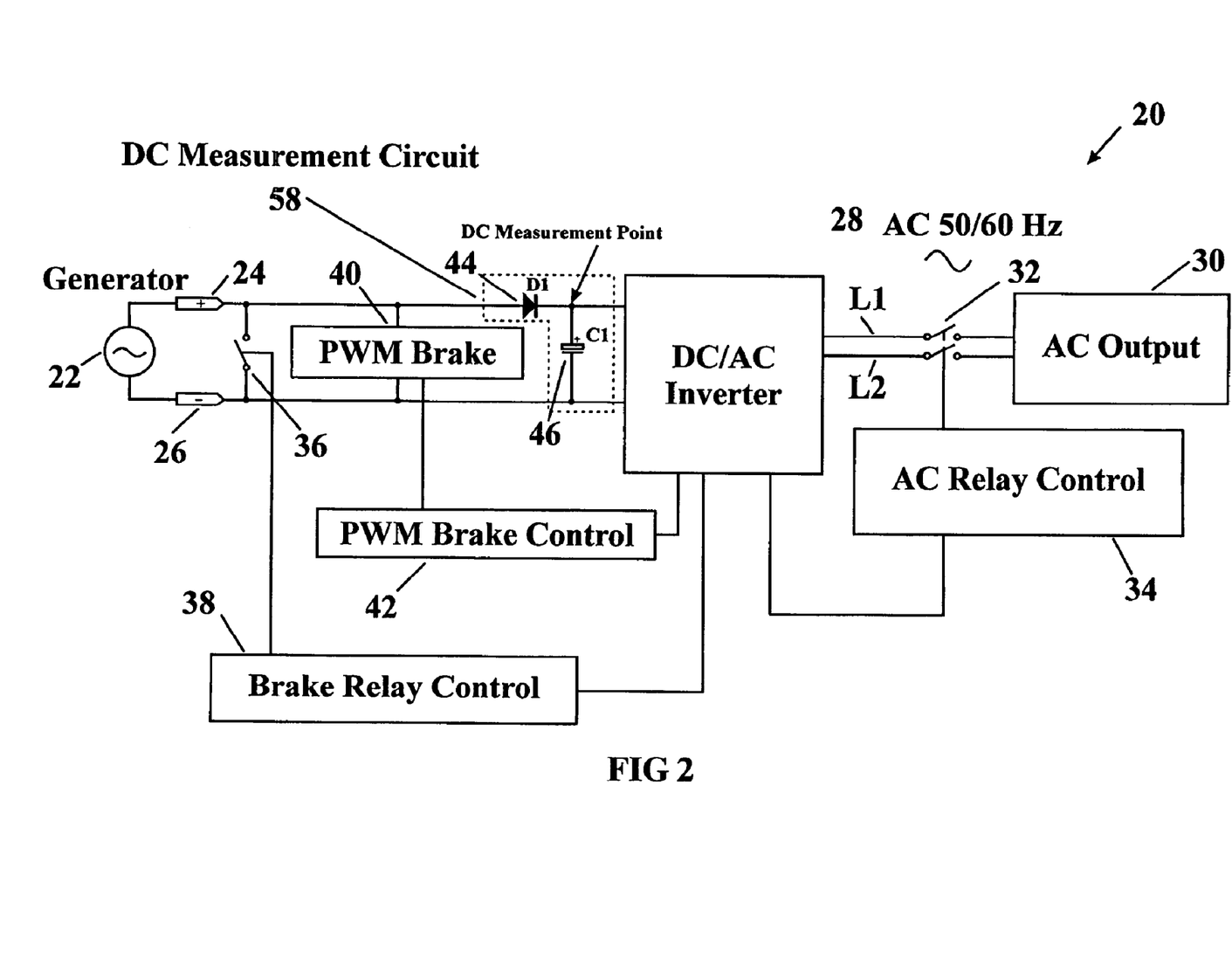
FIG. 2 is a block diagram as illustrated in FIG. 1, further illustrating the over speed control circuit in accordance with the present invention.

These problems are solved by the over speed control circuit in accordance with the present invention. With reference to FIG. 2, the over speed control circuit in accordance with the present invention includes a pulse width modulated (PWM) Brake switch 40 that is under the control of a PWM brake control circuit 42. The PWM Brake switch 40 is connected across the output terminals 24, 26 of the generator 22 and is thus in parallel with the brake relay 24. The PWM Brake control circuit 42 continuously monitors the generator output voltage at the DC Measurement Point and compares the generator output voltage with an over speed threshold voltage, for example 300 Volts DC, relatively less than the lock out threshold voltage used to trigger the brake relay 36. As will be described in more detail below, the over speed control circuit in accordance with the present invention minimizes operation of the brake relay 36, thus optimizing the operation of the wind turbine generator system 20 and maximizing the power exported to the utility AC power grid 30.

The DC output voltage of the generator 22 may be measured by a DC Measurement Circuit 58 or a sensor. In particular, the DC Measurement Circuit 58 may include a diode 44 and a capacitor 46. With such a configuration, the DC Measurement Point (i.e. cathode of the diode 44) is separated from the generator 22 by way of the diode 44. The measurement side of the diode 44 may be coupled to relatively large metal film hold up capacitor 46, for example, 1000 microfarads, which holds the generator output voltage relatively constant during measurement once the capacitor 46 is fully charged defining the DC Measurement Point. When the generator output voltage at the DC Measurement Point reaches the maximum rated design voltage (i.e. over speed threshold), the PWM Relay Control Circuit 42 generates a drive signal to actuate the PWM Brake 40. As will be discussed in more detail below, the PWM Brake 40 may be configured as an n-channel MOSFET, coupled across the output terminals 24, 26 of the generator 22. In such a configuration, the drive signal from the PWM Brake Control circuit 42 is applied to the gate terminal of the n-channel MOSFET. When the drive signal is pulled high, the MOSFET is turned on. This condition looks like a short to the generator 22. The short across the generator 22 slows the turbine down with a corresponding decrease in the generator output voltage. At this point, the voltage from the generator 22 falls below the voltage of the DC Measurement Point (i.e. the voltage on the capacitor 46). This condition back biases the series diode 44, effectively isolating the generator 22 from the DC Measurement Point. The hold up capacitor 46, coupled to the DC measurement point, is used to supply current to a flyback section of the inverter 28 during a flyback mode. While the capacitor 46 supplies current to the inverter 28, the voltage at the DC measurement point (i.e. voltage on the capacitor 46) will decrease to a point below the over speed threshold voltage. When the voltage on the capacitor 46 drops below the over speed threshold value, the PWM Brake Control circuit 42 generates a low signal that is applied to the gate of the MOSFET causing the MOSFET to turn off. Once the MOSFET is turned off, the turbine can now spin freely and the DC input voltage from the generator will change according to the available wind speed.

The ramp-up voltage of the generator 22 is moderated by the load presented to the generator 22 through recharge of the holdup capacitor 46. The recharge time of the capacitor 46 allows ample time for the MOSFET to turn off. The effect is to set up a PWM regulator whose duty cycle is inversely proportional to the DC voltage. The controlled voltage allows for the generator 22 to operate under a much wider band of wind speed than would normally be possible with the electromechanical method.

Figure 3:
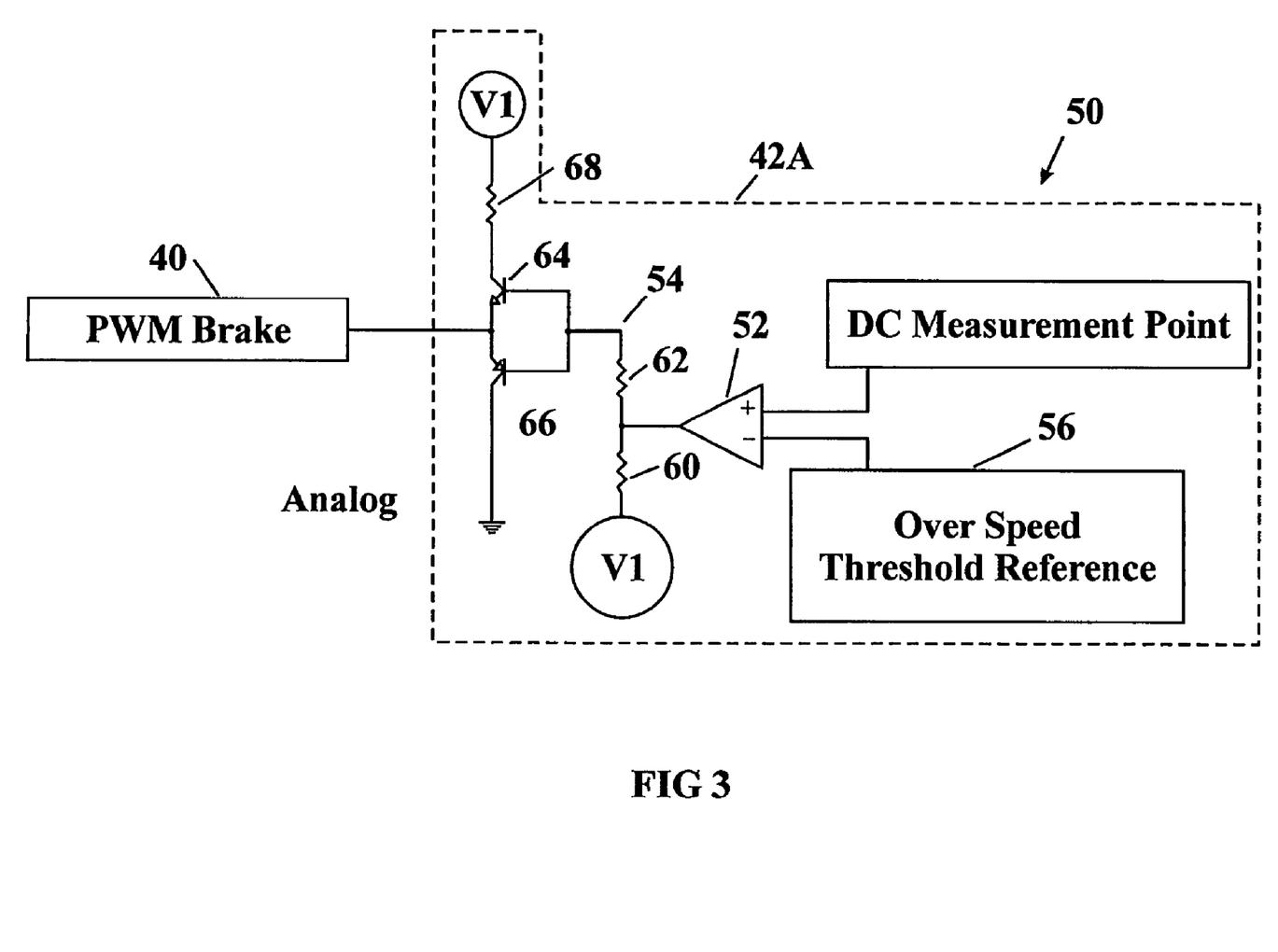
FIG. 3 is a schematic diagram of an analog embodiment of the over speed control circuit in accordance with the present invention.

FIG. 3 illustrates an exemplary analog embodiment of the over speed control circuit in accordance with the present invention, generally identified with the reference numeral 50. The over speed control circuit 50 includes the PWM Brake 40, for example, a MOSFET, coupled across the output terminals 24, 26 (FIG. 2) of the generator 22 and the PWM Relay Control Circuit 42A (FIG. 3), shown within the dashed box. The PWM Brake Control Circuit 42A is an analog circuit and includes a comparator 52 and a driver circuit, generally identified with the reference numeral 54. The over speed threshold signal or reference 56 is applied to an inverting input of the comparator 52. The generator output (i.e cathode of the diode 44), identified in FIG. 3 as the DC Measurement Point, is applied to a non-inverting input of the comparator 52.

The generator output voltage may alternatively be sensed by a sensor or virtually any means for providing a signal representative of the generator output voltage. For example, the sensors may include a step down transformer.

When the output voltage of the generator 22 at the DC Measurement Point exceeds the Over Speed Threshold Reference 56, the output of the comparator 52 goes high, thus actuating the PWM Brake 40 to effectively short the output terminals 24, 26 of the generator 22. As mentioned above, the output of the comparator 52 will remain high until the voltage on the capacitor 46 (FIG. 2) drops below the Over Speed Threshold Reference 56. At that point, the output of the comparator 52 will go low, thus providing PWM control of the PWM Brake 40.

The output of the comparator 52 may be applied to a driver circuit 54. The driver circuit 54 illustrated in FIG. 3 is merely exemplary and includes a pair of serially coupled resistors 60 and 62. The output of the comparator 52 is applied to a node defined between the serially coupled resistors 60, 62. One resistor is coupled to a voltage source V1. The resistors 60 and 62 act as a voltage divider to pull up the output of the comparator 52 to a predetermined value. The driver circuit 54 also includes a pair of complementary bipolar junction transistors 64 and 66 connected in a push-pull configuration. More particularly, the transistor 64 is an NPN transistor while the transistor 66 is a PNP. The bases and emitters of the transistors 64 and 66 are coupled together. The collector of the transistor 64 is pulled high by way of a pull up resistor 68. The collector of the transistor 66 is pulled low and is connected to ground. The emitters of the transistors 64 and 66 are coupled to the PWM Brake 40.

In operation, when the output of the comparator 52 is low, the PNP transistor 66 is turned on, connecting the PWM Brake 40 to ground, in which case n-channel MOSFETS used as the PWM Brake 40, remain off. When the output of the comparator 52 goes high, the PNP transistor 66 turns off and the NPN transistor 64 turns on. This causes the PWM Brake to be pulled high, thus causing the n-channel MOSFET, used for the PWM Brake 40 to be turned on, effectively shorting the generator 22.

Figure 4:
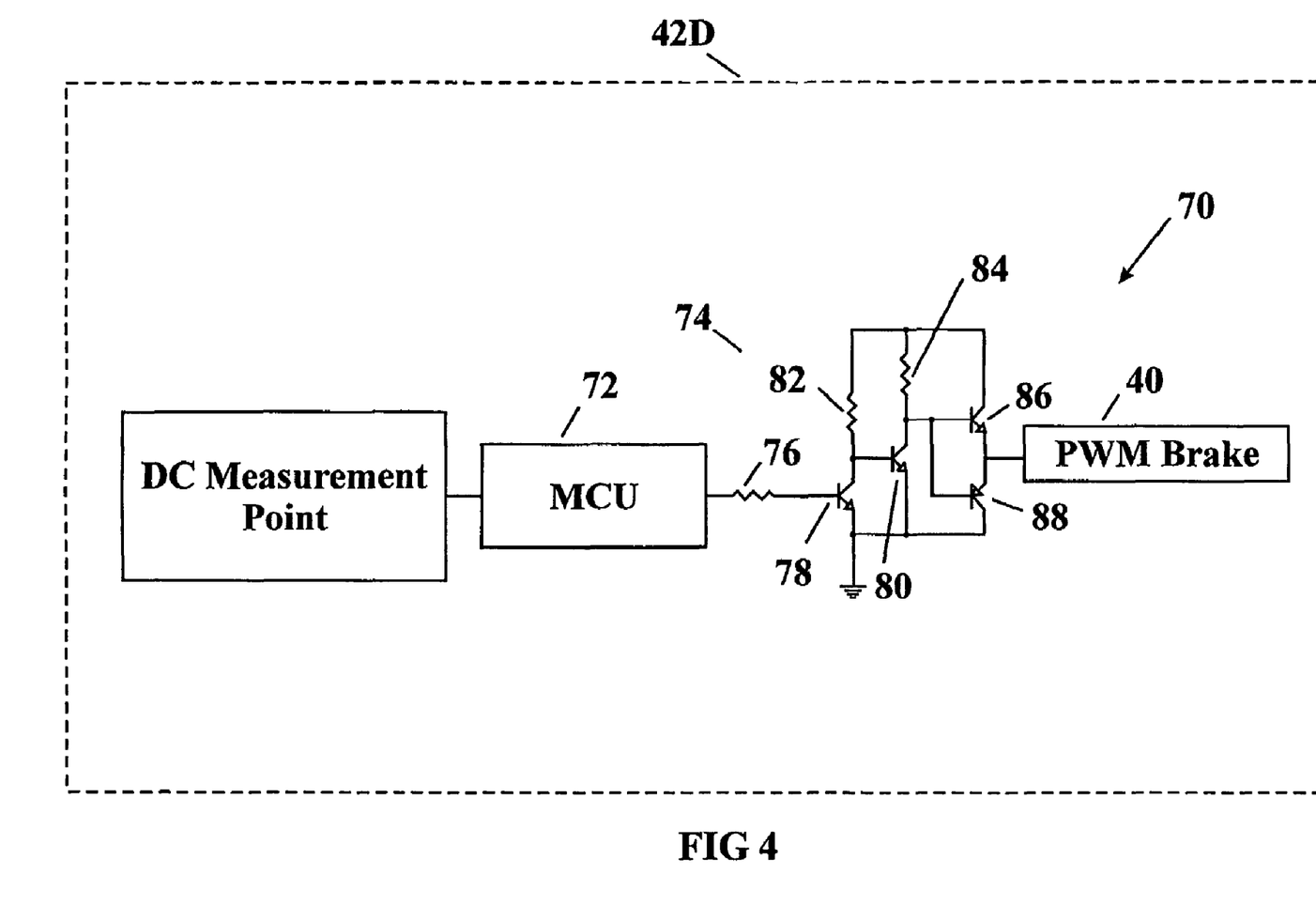
FIG. 4 is a schematic diagram of an alternative digital embodiment of the over speed control circuit in accordance with the present invention.
Figure 5:
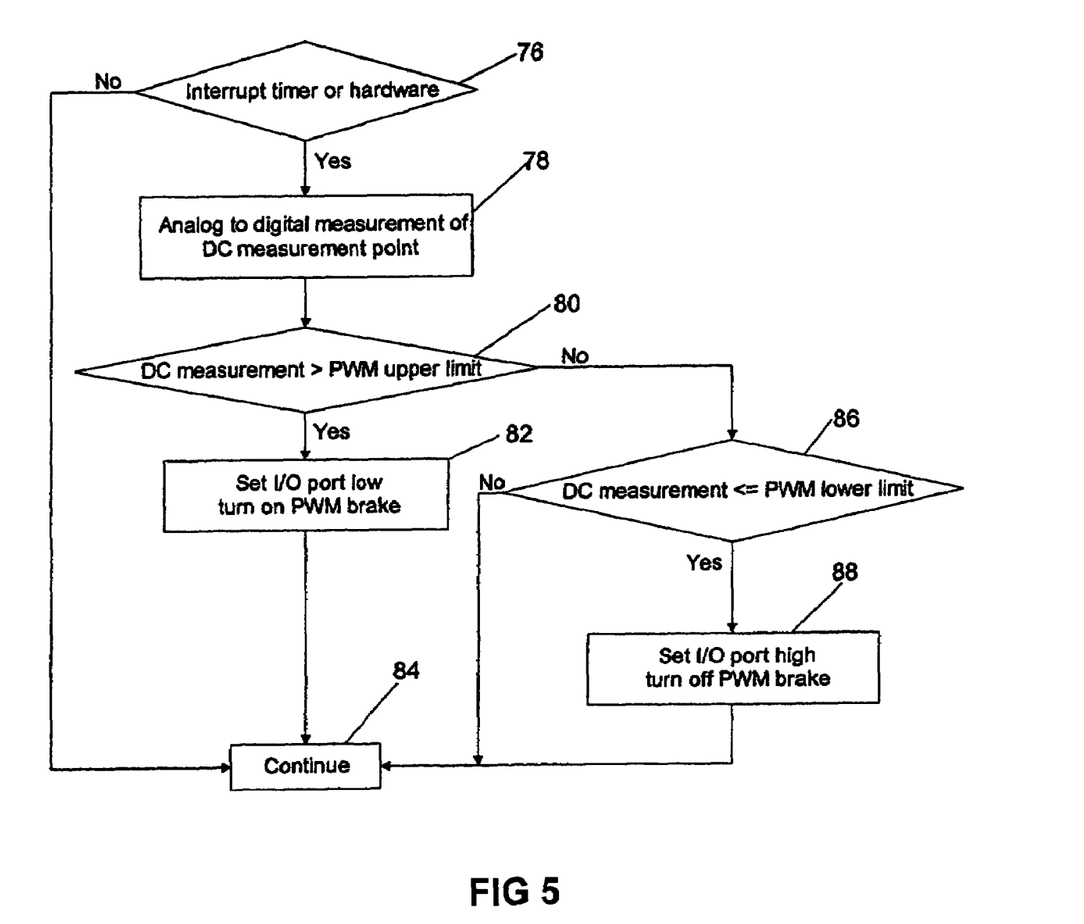
FIG. 5 is a flow chart for the embodiment illustrated in FIG. 4

An exemplary alternate digital embodiment of the over speed control circuit in accordance with the present invention is illustrated in FIG. 4 and generally identified with the reference numeral 70. The over speed control circuit 70 includes the PWM Brake 40 and the PWM Brake Control Circuit 42D. The PWM Brake Control Circuit 42D includes a microprocessor 72 and a driver circuit 74. A flow diagram for the microprocessor is illustrated in FIG. 5. The voltage at the DC Measurement Point (i.e. voltage at the cathode of the diode 44, as illustrated in FIG. 2) is monitored by the microprocessor 72.

Referring to FIG. 5, monitoring of the voltage at the DC Measurement Point may be interrupt driven, as indicated by step 76. Upon an interrupt, the analog DC voltage from the DC Measurement Circuit 58 is converted to a digital value by an on-board analog to digital converter (not shown), as indicated in step 78. The system then checks in step 80 if the value of the voltage at the DC Measurement Point is greater than a PWM upper limit (i.e. over speed threshold plus a constant). If so, the PWM Brake 40 is actuated in step 82 and the n-channel MOSFET is turned on to short the generator 22. The system then continues its processing in step 84 after servicing the interrupt.

If the system determines in step 80 that the voltage at the DC Measurement Point is not greater than the PWM upper limit (i.e. over speed threshold plus a constant), the system checks in step 86 whether the voltage at the DC Measurement Point is less than or equal to a PWM lower limit (i.e. over speed threshold minus a constant) in step 86. If not, the system returns to step 84 and continues its processing. If it is determined in step 86 that the voltage at the DC Measurement Point is less than the PWM lower limit, for example, due to a voltage on the capacitor 46, the PWM Brake 40 is turned off in step 88. The upper and lower PWM limits are used to set the duty cycle of the PWM.

The driver circuit 74 (FIG. 4) includes a current limiting resistor 76, a pair of BJTs 78, 80, configured as a voltage enhancement circuit, a pair of load resistors 82, 84 coupled to the collector terminals of the transistors 78 and 80 and a pair of complementary BJTs, 86, 88, connected in a push-pull configuration. The base and emitter terminals of the transistors 86 and 88 are coupled together. The base terminals of the transistors 86 and 88 are coupled to the collector of the NPN transistor 80. The emitter terminals of the transistors 86 and 88 are tied to the PWM Brake 40. The emitter terminals of the NPN transistors 78 and 80 are connected to ground.

In operation, whenever the microprocessor 74 outputs a high signal on its I/O port, the NPN transistor 78 is turned on, the NPN transistor 80 is turned off, connecting the base terminal of the PNP transistor 88 and the base terminal of the PNP transistor 86 to the high DC rail by way of the resistor 84, thus turning off the PNP transistor 88 and turning on the NPN transistor 86. As mentioned above, the PWM Brake 40 may be configured as an n-channel MOSFET. As such when the PNP transistor 86 is turned on, the MOSFET will be turned on. Thus allowing it to turn on and connect the positive voltage DC voltage rail to the DC Brake 40. This causes the n-channel MOSFET, used as the PWM Brake 40, to turn on. Alternatively, when the I/O port of the microprocessor 72 is forced low, the NPN transistor 78 is turned off, the NPN transistor 80 is turned on. During this condition, the base of the transistor 86 goes to ground, the transistor 88 is turned on and the MOSFET will be turned off.

Referring to FIG. 2, a wind turbine generator system 20 in accordance with the present invention includes a Brake Relay 36, a Brake Relay Control Circuit 38, a PWM Brake 40, a PWM Brake Control Circuit 42, a DC Measurement circuit 58, for example, the diode 44 and the capacitor 46, an inverter 28, a grid relay 32 and a AC Relay Control Circuit 34. Inverters are extremely well known in the art and are used to convert DC electrical power to AC electrical power. Various inverters 28 may be used with the present invention. Exemplary inverters which may be used with the present invention are disclosed in U.S. Pat. Nos. 5,552,712; 5,907,192 and 6,256,212 and US Patent Application Publication No. US 2005/0012339 A1, all hereby incorporated by reference.

Figure 6A:
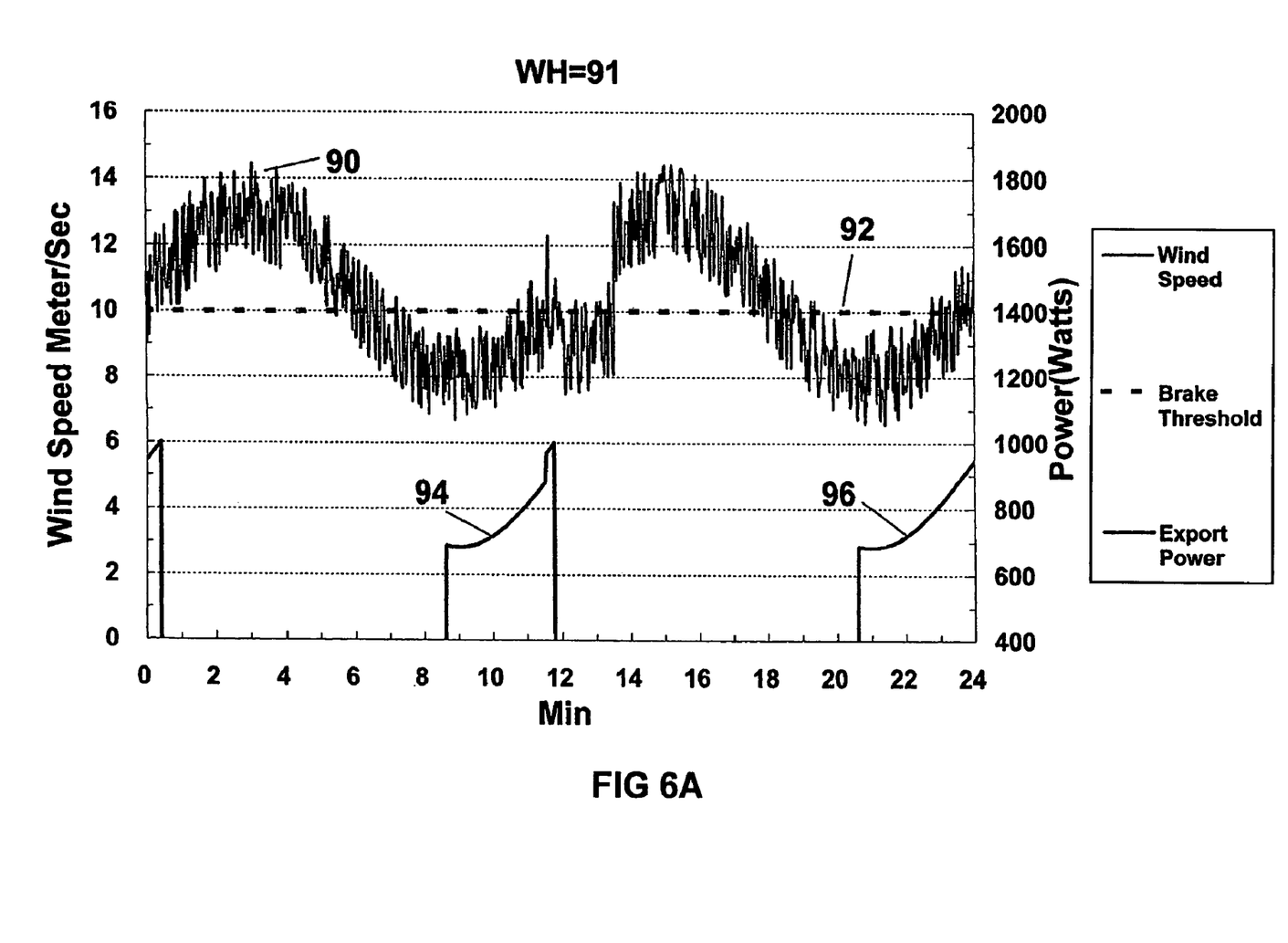
FIG. 6A is a graphical illustration of wind speed and power output of a wind turbine generator as a function of time for a wind turbine generator system that utilizes an over speed lock out relay as illustrated in FIG. 1.
Figure 6B:
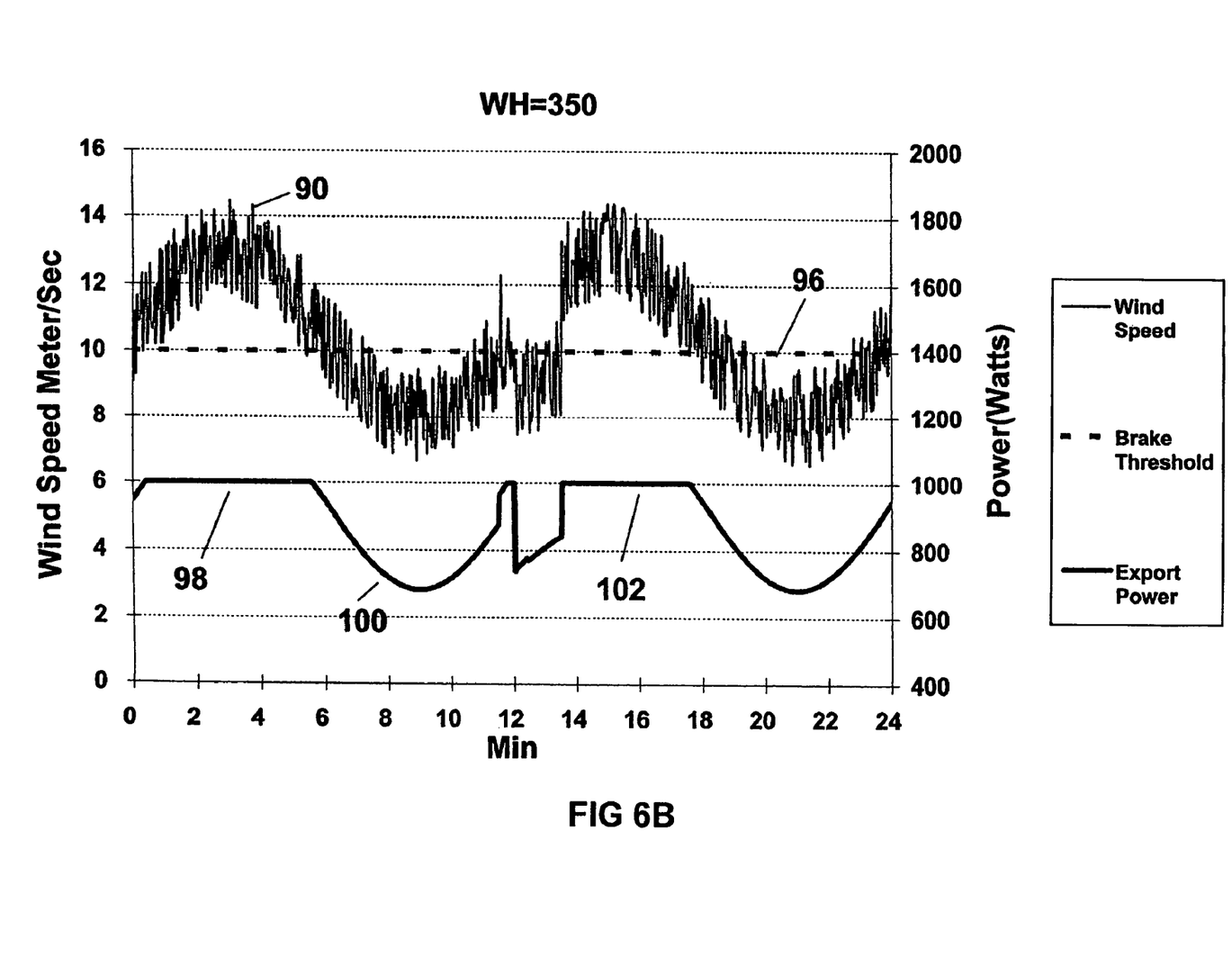
FIG. 6B is similar to FIG. 6A but illustrates the power output of the generator over time for a wind turbine generator control system which includes the over speed control circuit in accordance with the present invention.

FIG. 6A illustrates the power exported by a conventional wind turbine generator system as illustrated in FIG. 1. FIG. 6B illustrates the power exported by a wind turbine generator system in accordance with the present invention. Referring first to FIG. 6A, the curve 90 is an exemplary curve of the wind speed as a function time. The line 92 represents the lockout threshold value, for example, 10 meters per second. As shown, as the wind speed increases above the lockout threshold, the Brake Relay 36 locks out the generator 22 resulting in no power being exported to the utility AC power grid 30 for the lockout period of 3 minutes. After the lockout period expires, as the wind speed drops below the lockout threshold 92, the wind turbine generator system exports power, as indicated by the curve 94, until the wind speed goes above the lockout threshold 92. As shown in FIG. 6A, this occurs at about 12 minutes. The wind turbine generator system is again locked out for 3 minutes. After the second lockout period, as the wind speed drops below the lockout threshold, the wind turbine generator system again begins exporting power at about 21 minutes, as indicated by the curve 96. Thus for the 24 minute time period illustrated in FIG. 6A, the total power exported to the utility AC power grid 30 is the sum of the areas under the curves 94 and 96. For the exemplary data indicated in FIG. 6A, the total power exported is 91 watts-hours.

FIG. 6B illustrates the power exported by a wind turbine generator system in accordance with the present invention. For the same wind speed curve 90 illustrated in FIG. 6A. In this case, the dotted line 96 represents the over speed threshold, for example 10 meters per sec. The over speed threshold is selected to be lower than the lockout threshold. As shown, any time the wind speed exceeds the over speed threshold 96, the PWM Brake 40 electronically brakes the generator 22 to allow maximum power, for example, 1000 watts, to be exported by the generator from about 0.5 minutes to about 6 minutes, as indicated by the segment 98 of the curve 100. With the conventional system, as illustrated in FIG. 6A, the wind turbine generator system was locked during this same time period and exported no power. As the wind speed drops off during the time period from about 6 minutes to 12 minutes, the power exported drops below the maximum as a function of the wind speed. From 14 minutes to 18 minutes, the system exports maximum power, as indicated by the line segment 102. During this same time period, the conventional wind turbine generator system was locked out because the wind speeds exceeded the lockout threshold and thus exported no power during this period. From 18 minutes to 24 minutes, the wind turbine generator system exported power to the utility AC power grid 30 as a function of the wind speed, which remained below the lockout threshold and the over speed threshold. The total power exported by the wind turbine generator in accordance with the present invention is 350 Watt-hours, significantly higher than the conventional system illustrated in FIGS. 1 and 6A.

Obviously, many modifications and variations of the present invention are possible in light of the above teachings. Thus, it is to be understood that, within the scope of the appended claims, the invention may be practiced otherwise than as specifically described above.

What is claimed and desired to be secured by a Letters Patent of the United States is:

We claim:

1. An over speed control circuit for a wind turbine generator system configured to be connected to a power grid, said wind turbine generator system having a generator for generating an output voltage as a function of the speed of the generator, said generator having at least one pair of output terminals and a first switch coupled across the output terminals of said generator which opens for a predetermined time thereby disconnecting said generator from said power grid in response to an overspeed control signal; the control circuit comprising:

- a measurement circuit for sensing the generator output voltage at the output terminals of said generator;
- a second switch coupled across the output terminals of said generator which closes in response to a control signal; and
- a control circuit, responsive to said measurement circuit, for generating a control signal to close said second switch when said generator output voltage is greater than a threshold and generating a control signal to open said second switch when said generator output voltage drops below said threshold defining a pulse width modulated (PWM) control signal, said control signal selected to cause said second switch to close at a lower voltage than said first switch.

2. The over speed control circuit as recited in claim 1, wherein said measurement circuit includes a diode having an anode and a cathode, said diode serially coupled to one of said output terminals such that the anode of said diode is connected to the generator and said cathode defines a DC measurement point.

3. The over speed control circuit as recited in claim 2, further including a capacitor coupled across said output terminals of said generator.

4. The over speed control circuit as recited in claim 3, wherein said capacitor is also coupled to said cathode of said diode.

5. The over speed control circuit as recited in claim 1, wherein said control circuit is an analog circuit.

6. The over speed control circuit as recited in claim 1, wherein said control circuit is a digital circuit.

7. The over speed control circuit as recited in claim 1, wherein said switch includes at least one transistor connected across said output terminals of said generator.

* * * * *